(12) United States Patent
Bigarella et al.

(10) Patent No.: US 11,143,020 B2
(45) Date of Patent: Oct. 12, 2021

(54) SUBSEA WELL EQUIPMENT LANDING INDICATOR AND LOCKING INDICATOR

(71) Applicant: Aker Solutions AS, Lysaker (NO)

(72) Inventors: Thiago Bigarella, Houston, TX (US); Richard Meronek, Houston, TX (US); Laura Small, Houston, TX (US); Douglas Caraway, Conroe, TX (US)

(73) Assignee: AKER SOLUTIONS AS, Lysaker (NO)

(*) Notice: Subject to any disclaimer, the term of this patent is extended or adjusted under 35 U.S.C. 154(b) by 0 days.

(21) Appl. No.: 16/790,328

(22) Filed: Feb. 13, 2020

(65) Prior Publication Data

US 2020/0182046 A1 Jun. 11, 2020

Related U.S. Application Data

(62) Division of application No. 16/079,462, filed as application No. PCT/NO2017/050035 on Feb. 13, 2017, now Pat. No. 10,655,454.

(Continued)

(51) Int. Cl.
*E21B 47/098* (2012.01)
*E21B 23/02* (2006.01)
(Continued)

(52) U.S. Cl.
CPC ............ *E21B 47/098* (2020.05); *B32B 27/08* (2013.01); *B32B 27/302* (2013.01); *B32B 37/15* (2013.01);
(Continued)

(58) Field of Classification Search
CPC .... E21B 47/0915; E21B 23/02; E21B 33/038; E21B 33/043
See application file for complete search history.

(56) References Cited

U.S. PATENT DOCUMENTS 3,081,113 A 3/1963 Haeber
3,115,933 A 12/1963 Haeber
(Continued)

OTHER PUBLICATIONS

Combined Search and Examination Report issued for UKIPO Application No. GB2104501.8 dated Apr. 14, 2021, 6 pages.
(Continued)

*Primary Examiner* — Aaron L Lembo
(74) *Attorney, Agent, or Firm* — Rothwell, Figg, Ernst & Manbeck, P.C.

(57) ABSTRACT

A subsea well equipment landing body (1) includes an indicator assembly to indicate landing of the landing body or to indicate locking of the landing body. The indicator assembly has a stem bore (7), a sliding stem (11) within the stem bore that has a stem head (23) protruding beyond an external face of the landing body. A stem channel (25) in the sliding stem extends between the stem head and a stem channel mouth (27), and is in fluid communication with the outside of the landing body. A hydraulic channel (9) in the landing body is in fluid communication with the stem bore. The stem channel mouth is positionable in a communicating position, in which there is fluid communication between the hydraulic channel and the stem channel, and a non-communicating position, without fluid communication between the hydraulic channel and the stem channel.

3 Claims, 7 Drawing Sheets

Related U.S. Application Data

(60) Provisional application No. 62/303,808, filed on Mar. 4, 2016.

(51) Int. Cl.
  *E21B 33/038* (2006.01)
  *E21B 33/043* (2006.01)
  *B32B 27/08* (2006.01)
  *B32B 37/15* (2006.01)
  *B32B 27/30* (2006.01)

(52) U.S. Cl.
  CPC ............ *E21B 23/02* (2013.01); *E21B 33/038* (2013.01); *E21B 33/043* (2013.01); *B32B 2325/00* (2013.01); *B32B 2439/70* (2013.01); *B32B 2535/00* (2013.01)

(56) References Cited

U.S. PATENT DOCUMENTS

| | | |
|---|---|---|
| 3,137,348 A | 6/1964 | Ahlstone et al. |
| 4,300,637 A | 11/1981 | Valka |
| 4,736,799 A | 4/1988 | Ahlstone |
| 4,938,289 A | 7/1990 | Van Bilderbeek |
| RE34,071 E | 9/1992 | Van Bilderbeek |
| 6,494,257 B2 | 12/2002 | Bartlett et al. |
| 6,598,680 B2 | 7/2003 | Deberry |
| 7,063,157 B2 | 6/2006 | Bartlett |
| 7,770,650 B2 * | 8/2010 | Young .................. E21B 23/004 166/344 |
| 8,403,056 B2 | 3/2013 | Gette et al. |
| 8,567,493 B2 | 10/2013 | June et al. |
| 8,662,189 B2 * | 3/2014 | Harsono ............... E21B 33/035 166/382 |
| 8,668,004 B2 | 3/2014 | June et al. |
| 8,746,354 B2 | 6/2014 | Head |
| 8,800,662 B2 | 8/2014 | Miller |
| 9,103,182 B2 | 8/2015 | Sinnott et al. |
| 9,353,592 B2 | 5/2016 | Kekarainen |
| 9,909,393 B2 | 3/2018 | Porter et al. |
| 2011/0083854 A1 | 4/2011 | Jennings |
| 2012/0018171 A1 | 1/2012 | Robottom et al. |
| 2012/0292035 A1 | 11/2012 | Fenwick |
| 2015/0345243 A1 | 12/2015 | Christie et al. |
| 2016/0305232 A1 | 10/2016 | Bird et al. |
| 2019/0145196 A1 | 5/2019 | Nonmacher et al. |

OTHER PUBLICATIONS

Combined Search and Examination Report issued for UKIPO Application No. GB2104500.0 dated Apr. 14, 2021, 7 pages.

* cited by examiner

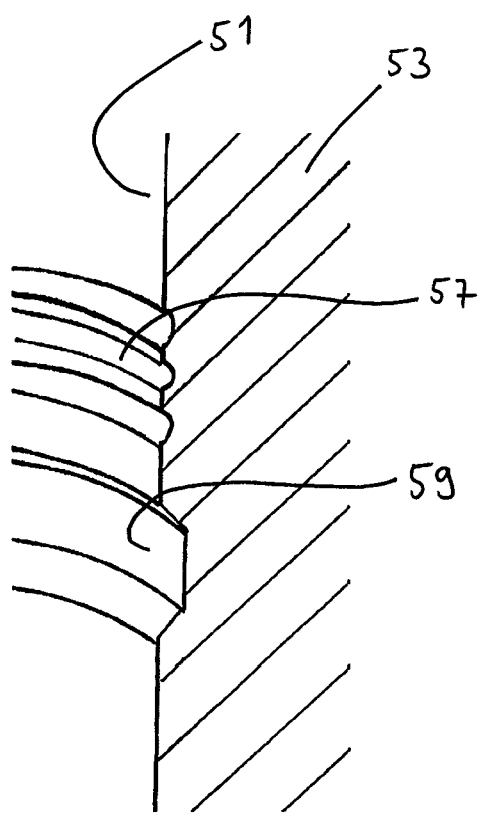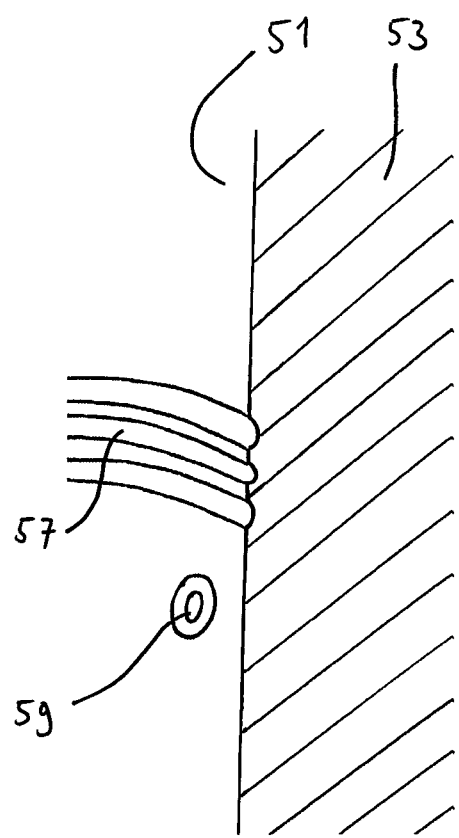
Fig. 6
Fig. 7

SUBSEA WELL EQUIPMENT LANDING INDICATOR AND LOCKING INDICATOR

CROSS REFERENCE TO RELATED APPLICATION

This application is a Divisional of U.S. patent application Ser. No. 16/079,462 filed on Aug. 23, 2018, which is a 35 U.S.C. 371 National Phase Entry Application from PCT/NO2017/050035 filed on Feb. 13, 2017, which claims the benefit of U.S. Ser. No. 62/303,808 filed on Mar. 4, 2016, the disclosures of which are incorporated herein in their entirety by reference.

The present invention relates to a subsea well equipment landing indicator assembly and a locking indicator assembly. In particular, it relates to a landing and a locking indication assembly and an associated method of providing a landing/locking indication when landing/locking equipment inside a bore of a subsea well component.

BACKGROUND

Tubing hanger operations are well known in the petroleum industry. Typically, during the completion of a well, a production tubing is lowered into the wellbore. The production tubing is suspended from a tubing hanger, which is landed and locked within a wellhead assembly. The well can then be produced through the production tubing. This process and the requirements during tubing hanger landing operations are well known in the art, and are discussed in US20120292035.

In order to ensure the integrity of the well system and to avoid leakages, it is critical that the tubing hanger is landed and locked appropriately before production starts. A correct landing will ensure that sealing faces and lock arrangements are properly engaged. To this end, US20120292035 describes a tubing hanger setting confirmation system, to provide a positive indication of landing of a wellhead member and locking of a wellhead member to a wellhead.

Within the field of subsea well assemblies, in addition to tubing hangers, other equipment is also landed within a bore. Examples of such other equipment include an internal tree cap (ITC), a bore protector, a tubing hanger running tool (THRT), and a plug. Typically, such equipment is landed within a bore, and then locked in position by actuation of an actuation sleeve or other actuation component, which will engage locking means.

An object of the present invention can be to provide an indication assembly that provides unequivocal indication of correct landing and/or correct locking of a landing body.

Possible additional advantages and objects may appear from the following description.

SUMMARY OF THE INVENTION

According to a first aspect of the present invention, there is provided a subsea well equipment landing body having an indicator assembly configured to indicate landing of the landing body or to indicate locking of the landing body. The indicator assembly comprises a stem bore and a sliding stem within the stem bore. The sliding stem has a stem head protruding beyond an external face of the landing body. A stem channel is provided in the sliding stem, extending between the stem head and a stem channel mouth. Moreover, the stem channel is in fluid communication with the outside of the landing body, advantageously through a mouth in the stem head. A hydraulic channel is arranged in the landing body, and is in fluid communication with the stem bore. According to the invention, the stem channel mouth is positionable in

- a communicating position, in which there is fluid communication between the hydraulic channel and the stem channel; and
- a non-communicating position, in which there is no fluid communication between the hydraulic channel and the stem channel.

The feature of having the stem head protruding beyond the external face of the landing body, shall herein mean that either the stem head as such extends beyond the external face, and/or that a head extension element extends beyond the external face of the landing body. The latter situation apply in particular to embodiments where a head extension element is attached to the stem head. An example of such an embodiment is presented further below.

The sliding stem may advantageously be configured to slide in an axial stem direction, wherein the sliding stem has an outer radial stem face facing radially with respect to the axial stem direction. The stem channel mouth can then be arranged on the outer radial stem face. Moreover, a seal ring can be arranged between the outer radial stem face and the opposite face of the stem bore, adjacent the stem channel mouth.

In some embodiments of the subsea well equipment landing body, the stem channel mouth can be positionable in two non-communicating positions, one on respective sides of the communicating position. In alternative embodiments, the stem channel mouth could also be positionable in two communicating positions, one on respective sides of a non-communicating position. In such embodiments, the hydraulic channel should communicate with the stem bore at two different locations.

In some embodiments, a head extension element can be attached to the stem head. By attaching a head extension element, such as a key, onto the stem head, one can obtain a more robust assembly. Moreover, one can in this manner adapt the assembly to the specific use and interface with the engaging equipment in question (e.g. the inner face of a locking element or the inner face of a bore).

The subsea well equipment landing body according to the first aspect of the invention may in some embodiments further comprise a locking actuator component. The locking actuator component can typically be configured to slide against a locking element, in order to move the locking element towards a locking position, i.e. a position where it locks the landing body in its landed position. The locking actuator component can advantageously have a recessed locking indication face, which is recessed with respect to a radially inwardly facing first sliding face of the locking actuator component. In such embodiments, the stem head (or a head extension element attached to it) can slide first against the first sliding face, giving a non-locking signal to the operator, and then move into the recessed locking indication face, giving then a locking signal to the operator.

The subsea well equipment landing body according to the first aspect of the present invention may typically be a tubing hanger with a locking sleeve that is axially movable on the tubing hanger.

According to a second aspect of the present invention, there is provided a subsea well component having a bore configured to receive a landing body, typically a landing body according to the first aspect of the invention. The bore has a locking profile, which is configured to engage with locking means of the landing body, wherein the bore further comprises a landing indication profile on a radially inwardly facing face of the bore and at a vertical distance from the locking profile.

With a subsea well component having such a bore, a landing body may employ a landing indication means that engages the bore to provide a landing signal. This is contrary to known landing indication systems, which uses engagement with an upwardly facing shoulder or landing face in order to provide the landing signal.

The subsea well component according to the second aspect of the invention may include a landing indication profile that has a finite extension in the circumferential direction of the bore. Such a landing indication profile may for instance have the shape of a circular recess provided in the face of the bore. An advantage of such a landing indication profile, is that the operator may get positive indication both on correct vertical position, as well as on correct rotational position.

According to a third aspect of the present invention, there is provided a subsea well equipment landing body having a landing indication assembly, comprising a stem bore with a sliding stem. The sliding stem has a stem head configured to abut the inner face of a bore of a well component that is configured to receive the landing body. The sliding stem is configured to slide between a landed indicating position and a non-landed indicating position, of which in one position there is fluid communication between a hydraulic channel in the landing body and the bore, and in the other position there is not fluid communication between the hydraulic channel and the bore. According to the third aspect of the present invention, the stem bore extends in a radial or inclined direction, with respect to the axial direction of the bore.

In an embodiment of the third aspect of the invention, the subsea well equipment landing body further comprises a locking indication assembly, comprising a stem bore with a sliding stem. This sliding stem has a stem head configured to abut the inner face of a locking actuator component of the landing body. The sliding stem is configured to slide between a locked indicating position and a non-locked indicating position, of which in one position there is fluid communication between a hydraulic channel in the landing body and the bore and in the other position there is not fluid communication between the hydraulic channel and the bore. In such embodiments, the stem bore can extend in a radial or inclined direction, with respect to the axial direction of the bore.

With such an embodiment of the third aspect of the present invention, the landing body may have two identical or at least similar indication assemblies functioning in the same manner and with their stem bores both arranged in a radial or inclined direction. One of the indication assemblies can indicate landing, while the other one can indicate locking of the landing body.

EXAMPLE OF EMBODIMENT

In the following, a non-limiting discussion of an embodiment of the invention will be given with reference to the drawings, in which FIG. 1 is a side cross section view of a landing body in the form of a tubing hanger;

FIG. 6 is an enlarged, perspective, cross section view of a part of the bore of a subsea component;

FIG. 7 is an enlarged, perspective, cross section view according to FIG. 6, however depicting an alternative embodiment;

While the indication assembly according to the present invention may be used with a plurality of different types of subsea equipment, which is landed within the bore of a subsea component, the following example describes the landing of a tubing hanger that is landed in the bore of a subsea wellhead spool. As will be appreciated by the skilled person, the bore could also be the bore of a horizontal Xmas tree, or a tubing head spool, or any other bore of a subsea component. In particular, a landing body, which in the following example is in the form of the said tubing hanger, is a body used within the field subsea wells, such as for extraction of hydrocarbons or water injection.

Figure 1:
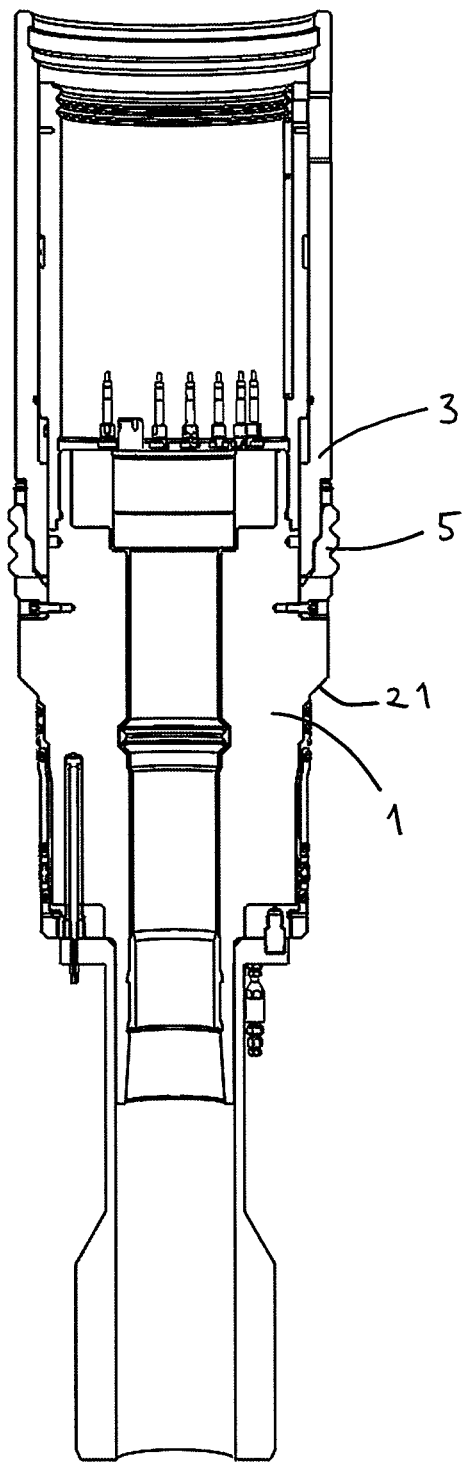
Figure 4:
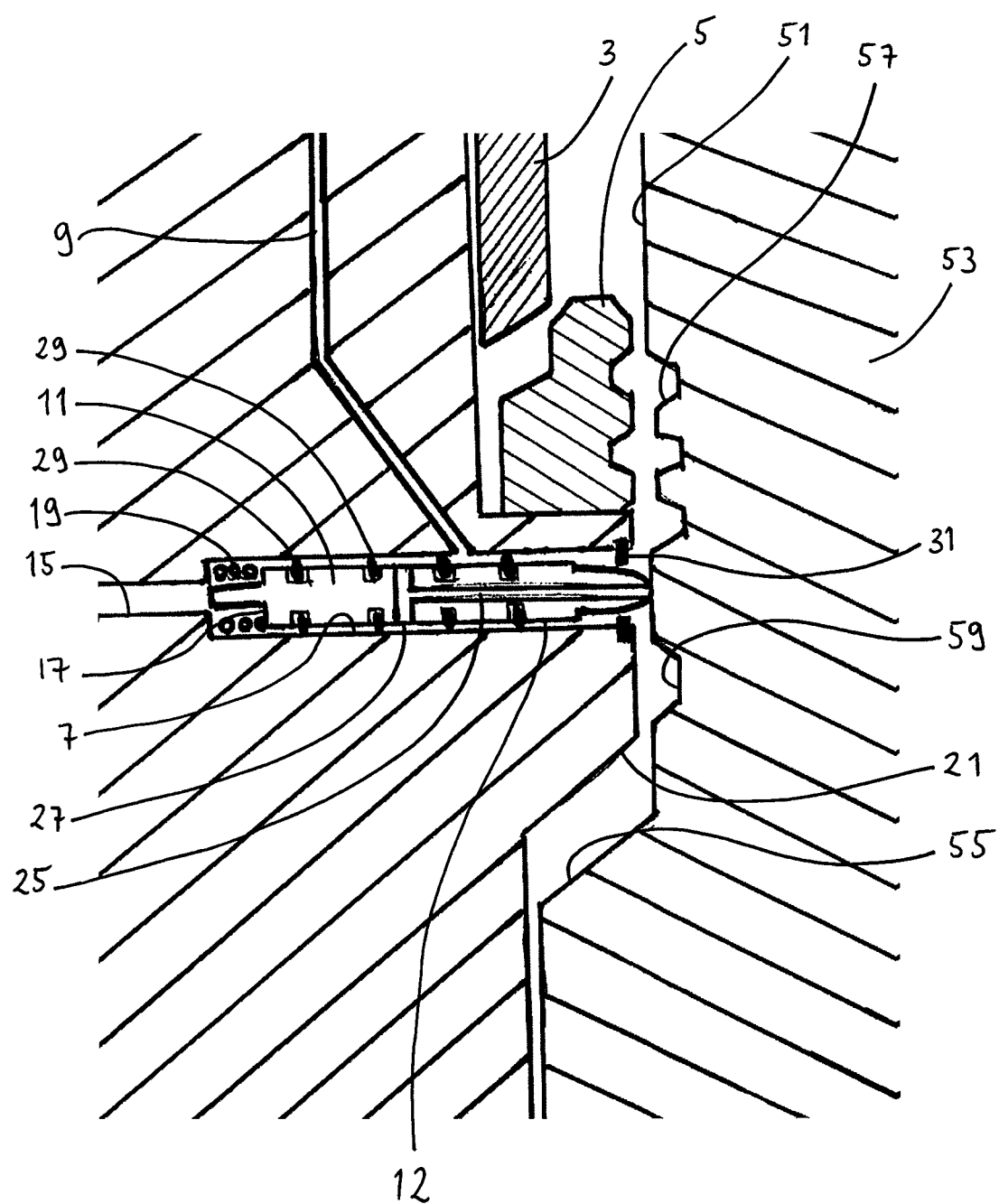

FIG. 1 illustrates a landing body in the form of a typical tubing hanger 1. The tubing hanger 1 has a landing shoulder 21, which is configured to rest on an opposite landing shoulder when in the landed position. Moreover, to secure the tubing hanger 1 in its landed position, it is equipped with a set of locking elements 5, such as locking dogs or a split ring. In this embodiment, the tubing hanger 1 comprises a locking sleeve 3, which is configured to move the locking elements towards their locked position. The locking sleeve 3 is configured to move in an axial direction, and engages the locking elements 5, when moving downwards, thereby forcing the locking elements 5 radially outwards into a locking engagement with facing locking profiles. The locking profiles are shown in FIG. 4.

Figure 2:
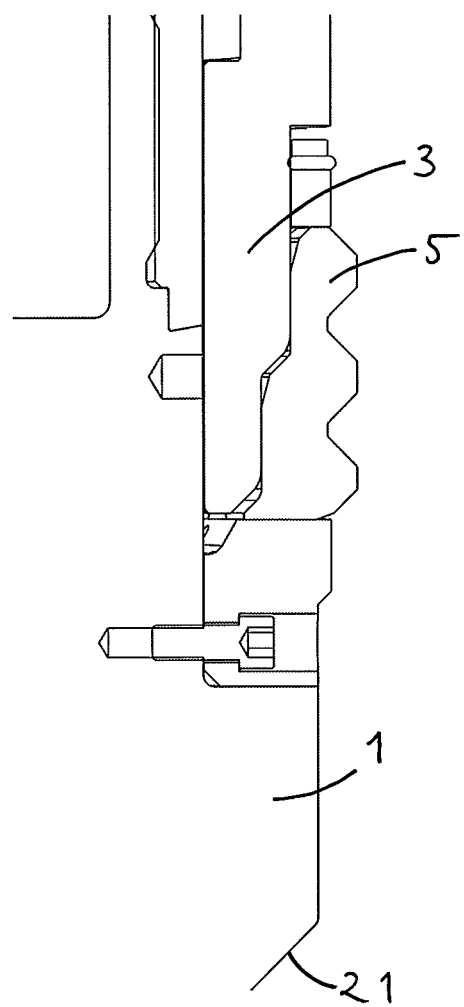
FIG. 2 is a detailed enlarged cross section view of the tubing hanger shown in FIG. 1, showing in particular a locking sleeve and a locking element.

FIG. 2 illustrates the engagement between the locking sleeve 3 and a locking element 5 in better detail. In this drawing, the locking sleeve 3 is shown in a lower position, in which it has moved the locking element 5 radially outwards into the locked position.

Figure 3:
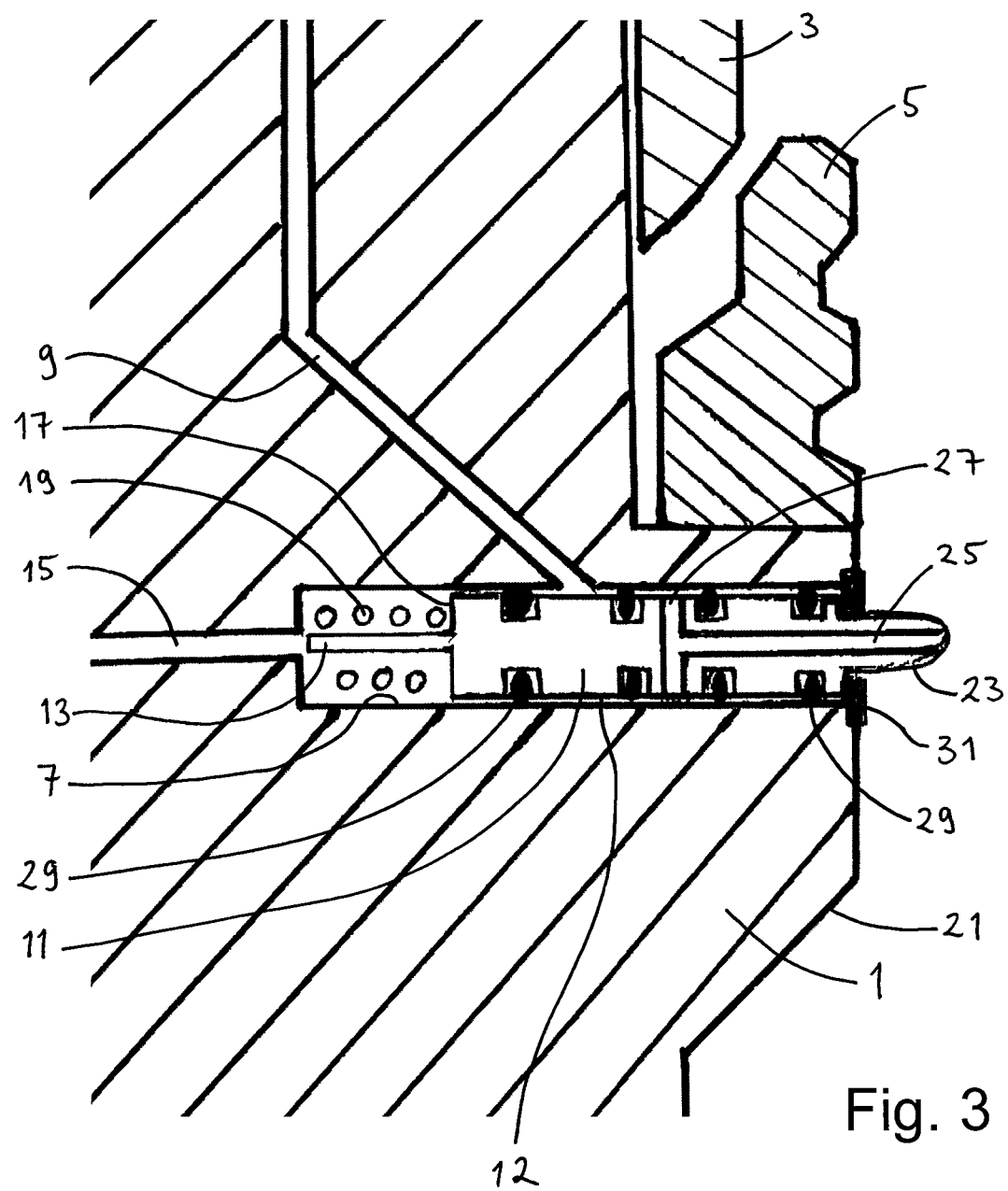
FIG. 3 to FIG. 5 are cross section views through a portion of a tubing hanger, which is equipped with an indication assembly according to the invention, configured for indication of a landed position.

It is now referred to FIG. 3, which illustrates a principle drawing of an indication assembly according to the present invention. In this embodiment, the indication assembly is used for indication of correct landing of the landing body, i.e. the tubing hanger 1.

In the body of the tubing hanger 1, there is provided a stem bore 7, which in this embodiment has a substantially radial extension. Moreover, from the stem bore 7, a hydraulic channel 9 extends upwardly within the body of the tubing hanger 1.

Within the stem bore 7 there is arranged a sliding stem 11. The sliding stem 11 is configured to slide back and forth within the stem bore 7. At a rear portion, the sliding stem 11 has a protruding stud 13. The protruding stud 13 will enter into a receiving bore 15 at the rear portion of the stem bore 7 when the sliding stem 11 is in a retracted (rear) position. The diameter of the receiving bore 15 is less than the diameter of the stem bore 7.

At the interface between the protruding stud 13 and the rest of the sliding stem 11, the sliding stem 11 has a shoulder 17. Between the shoulder 17 and an end portion of the stem bore 7, there is arranged a spring 19 which circles about the protruding stud 13. When the sliding stem 11 is in a retracted position (FIG. 4), the spring 19 is compressed, thereby biasing the sliding stem 11 towards an extended position, which is the position shown in FIG. 3.

The sliding stem 11 has a stem head 23 at its end, which is opposite the protruding stud 13. In the extended position shown in FIG. 3, the stem head 23 extends a distance beyond the radially facing surface of the tubing hanger 1 at the position of the stem bore 7.

FIG. 4 depicts the same portion of the tubing hanger 1, however lowered down into the bore 51 of a wellhead spool 53. In the position shown in FIG. 4 the landing face 21 of the tubing hanger 1 has not yet landed on a landing shoulder 55 within the bore 51 of the wellhead spool 53. Also shown in FIG. 4 is a locking profile 57 within the wellhead bore 53.

In the mode shown in FIG. 4, the sliding stem 11 is in a retraced mode, as the stem head 23 abuts a portion of the bore 51 of the wellhead 53. The engagement between the bore 53 and the stem head 23 compresses the spring 19.

Within the sliding stem 11, there is arranged a stem channel 25. The stem channel 25 extends between the stem head 23 and an intermediate portion of the sliding stem 11. At the intermediate portion, the stem channel 25 ends in a mouth 27 which faces radially with respect to the cylindrical shape or axial extension of the stem bore 7. That is, the sliding stem 11 has an outer radial stem face 12 that faces the radially inwardly facing face of the stem bore 7.

Moreover, on each axial side of the mouth 27, the sliding stem 11 is provided with two seal rings 29. The seal rings 29 thus seal between the sliding stem 11 and the stem bore 7, however permits the sliding movement of the sliding stem 11 back and forth.

To prevent the sliding stem 11 from excessive movement towards the extended position, there is arranged a retaining member 31 at the mouth of the stem bore 7. The stem head 23 extends beyond the retaining member 31.

When moving between the extended position shown in FIG. 3, and the retracted position shown in FIG. 4, the mouth 27 of the stem channel 25 moves past the hydraulic channel 9. During this movement, there will be fluid communication between the stem channel 25 and the hydraulic channel 9. The operator may apply a hydraulic pressure within the hydraulic channel 9 and monitor the pressure. Thus, when the mouth 27 moves past the hydraulic channel 9, the operator may monitor a pressure drop, since the hydraulic channel 9 in this position is in fluid communication with the space between the tubing hanger 1 and the bore 51.

Figure 5:
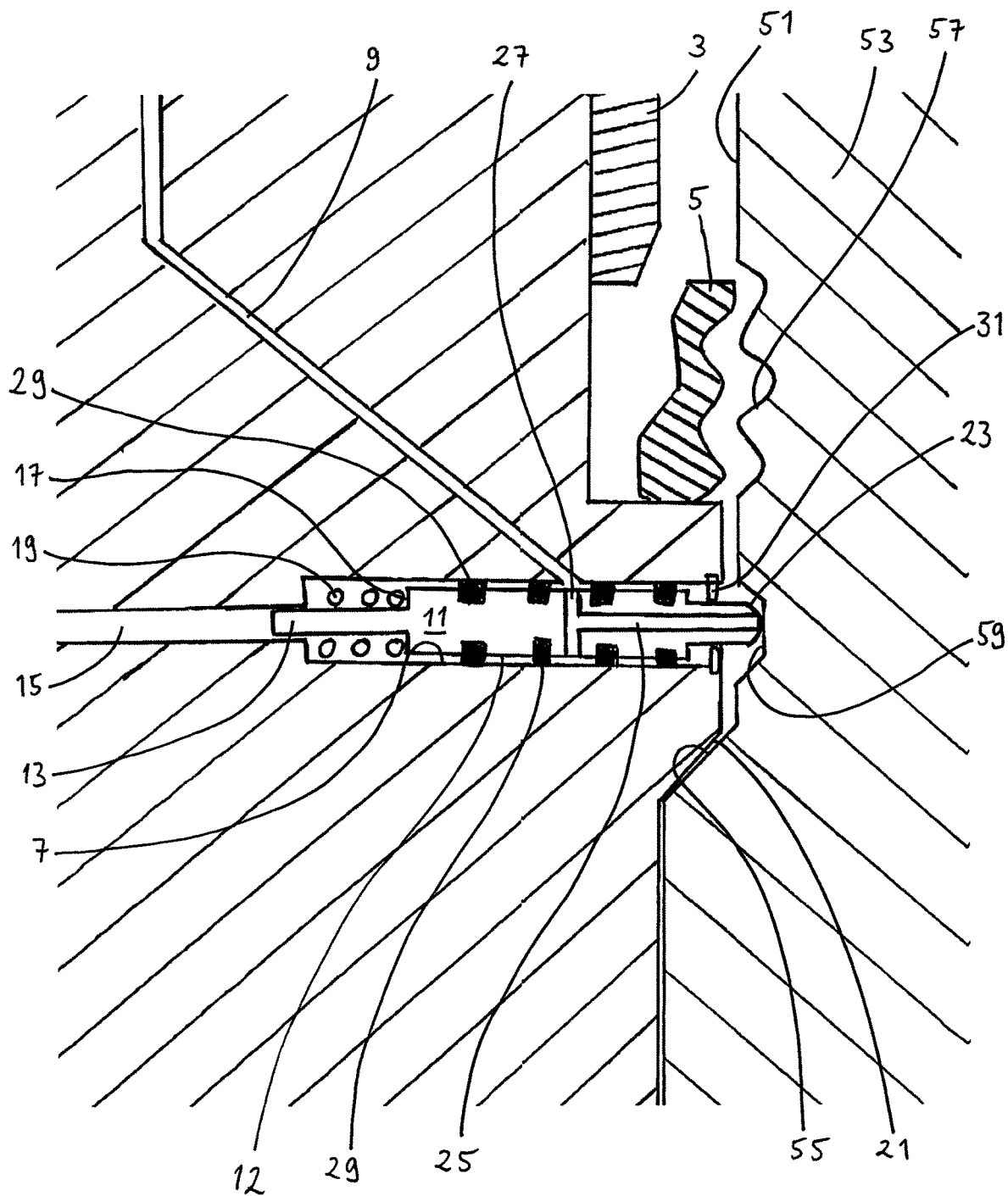

FIG. 5 depicts the same components as in FIG. 4. In FIG. 5, however, the tubing hanger 1 is fully landed within the bore 51 of the wellhead spool 53. When in this landed position, the stem head 23 has been moved into a landing indication profile 59. The landing indication profile 59 is formed as a recess in the bore 51 of the wellhead spool 53. The spring 19 forces the sliding stem 11 radially outwards, so that the stem head 23 abuts the radially outer face of the landing indication profile 59 (i.e. "lowest" portion of the recess). As shown in FIG. 5, when the sliding stem 11 is in this landed position, the mouth 27 of the stem channel 25 is aligned with the hydraulic channel 9 in the body of the tubing hanger 1. In this position, there is fluid communication between the hydraulic channel 9 of the tubing hanger 1, and the bore 51 of the wellhead spool 53. Thus, by keeping a positive pressure in the hydraulic channel 9 during installation, the operator can know that the tubing hanger 1 has fully landed when pressure in the hydraulic channel 9 drops to zero.

Thus, when moving the tubing hanger 1 from outside the bore 51 of the wellhead 53, into the landed position as shown in FIG. 5, the sliding stem 11 takes three main positions. Before entering the bore 51, the sliding stem 11 is in a fully extended position (FIG. 3), in which there is no fluid communication between the hydraulic channel 9 and the stem channel 25. Then, when entering the bore 51, the sliding stem 11 is moved into the retracted position (FIG. 4), in which there is no fluid communication. Finally, when the tubing hanger 1 has landed, fluid communication (FIG. 5) is provided, being an indication of a fully landed tubing hanger 1.

FIG. 6 depicts a part of the bore 51 of the wellhead 53 with a cross section, perspective view. In this embodiment, the landing indication profile 59 within the bore 51 has the form of a recess that extends continuously along the circumference of the bore 51. Thus, regardless of the mutual rotational orientation between the tubing hanger 1 and the wellhead 53, the stem head 53 will enter the landing indication profile 59 when the tubing hanger 1 has landed.

FIG. 7 depicts an alternative embodiment of a landing indication profile 59. Here, the landing indication profile 59 is in form of a circular blind hole (or a recess of some other shape) with a finite extension along the face of the bore 51. That is, the stem face 23 needs to have correct elevation (tubing hanger being fully landed) as well as a correct rotational alignment, in order to enter the landing indication profile 59 shown in FIG. 7. Although only one landing indication profile with finite extension has been shown in FIG. 7, one may arrange a plurality of such landing indication profiles 59 in the bore 51. In some embodiments, one may provide a plurality of landing indication profiles 59 and one sliding stem 11, which then needs to enter into one of the landing indication profiles 59. In other embodiments, one may provide a plurality of landing indication profiles 59 and a plurality of sliding stems 11. In this manner, redundancy may be provided. Indeed, it is also possible to arrange only one landing indication profile 59 and one sliding stem 11.

Figure 8:
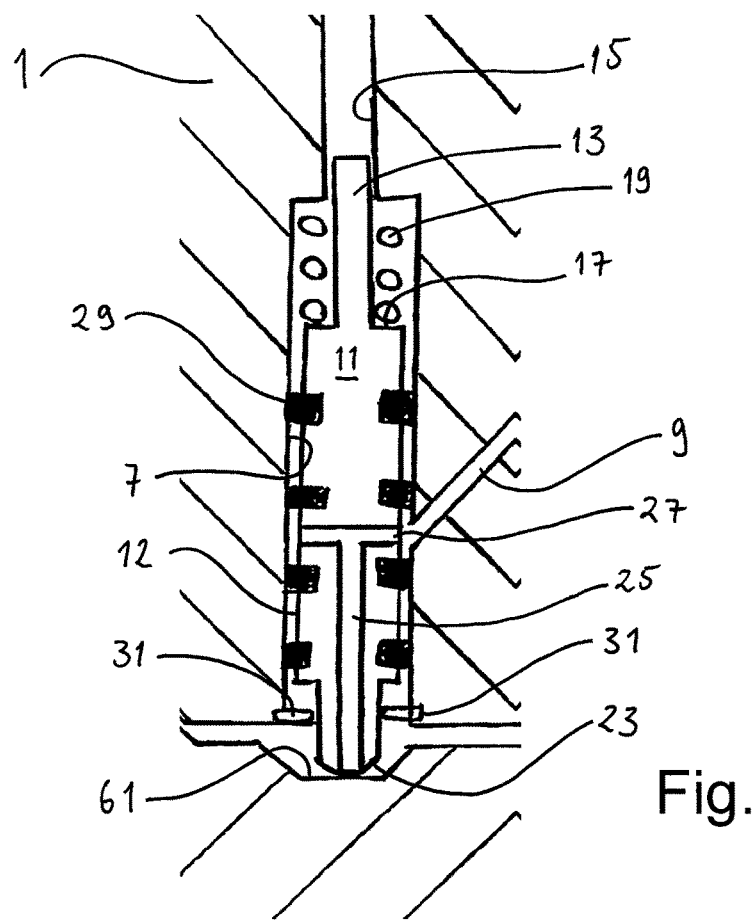
FIG. 8 is another embodiment of an indication assembly configured for landing indication.

FIG. 8 depicts another embodiment, wherein the axial direction of the stem bore 7 and the sliding stem 11 has a vertical orientation. In this embodiment, the stem head 23 abuts an abutting landing face 61 when landing, thereby moving the stem channel mouth 27 into alignment with the hydraulic channel 9. As with the landing indication assembly shown in FIG. 3 to FIG. 5, the landing indication assembly shown in FIG. 8 will also make the operator able to monitor the position of the sliding stem 11 through the hydraulic channel 9.

Figure 9:
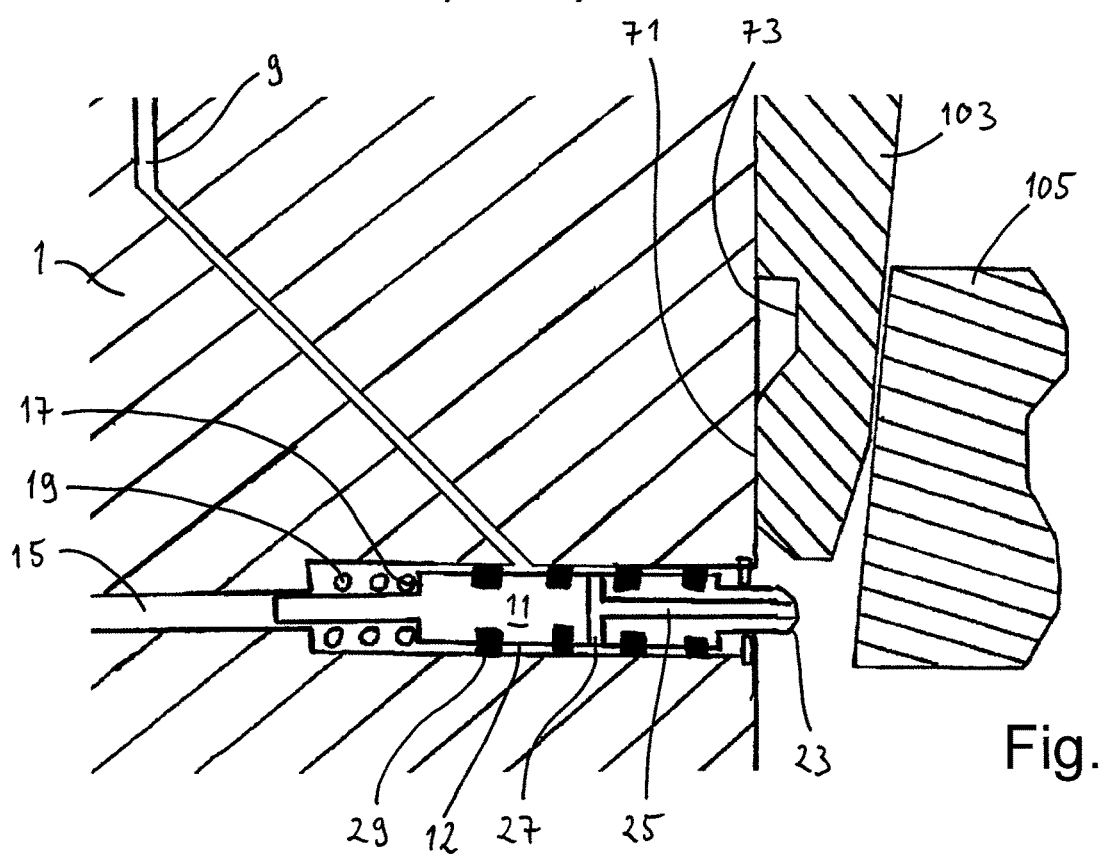
FIG. 9 shows an indication assembly according to the invention, configured to indicate locking of a landing body.

FIG. 9 shows an embodiment of an indication assembly configured to indicate locking of the landing body 1. The basic operation of this indication assembly corresponds to that of the indication assembly described above, configured for landing indication. However, the sliding stem is moved by a locking actuator component 103. Typically, such a locking actuator component 103 can be an axially moving locking sleeve, which is configured to move a locking segment. When used with the tubing hanger shown in FIG. 1 and FIG. 2, the locking actuator component 103 would be the locking sleeve 3, configured to actuate the locking elements 5. In the embodiment shown in FIG. 9, the locking element is a set of locking dogs 105, configured to radially into and out of a locking position. The locking element could also be a split lock ring.

In the position shown in FIG. 9, the mouth 27 is not in fluid communication with the hydraulic channel 9. Thus, the operator can monitor a positive pressure in the hydraulic channel 9. When the locking actuator component 103 is moved down, axially on the landing body 1 (tubing hanger in this embodiment), it will force the sliding stem 11 inwardly into the stem bore 7, by engagement of the stem head 23.

When entering into this engaged position, the spring 19 will become further compressed. The stem head 23 will abut a first sliding face 71 on the locking actuator component 103, while the latter continues to move down, so that the locking dogs 105 are moved towards the locked position.

When the locking actuator component 103 has moved down to its final, lower position, the locking dogs 105 are in their radially outward, locking position. When in this position, the stem head 23 has moved into a recess in the locking actuator component 103, within which there is a locking indication face 73. When the stem head 23 abuts the locking indication face 73, the mouth 27 will again be without fluid communication with the hydraulic channel 9, thereby signalling to the operator that the locking actuator component 103 has moved into its locking position.

Figure 10:
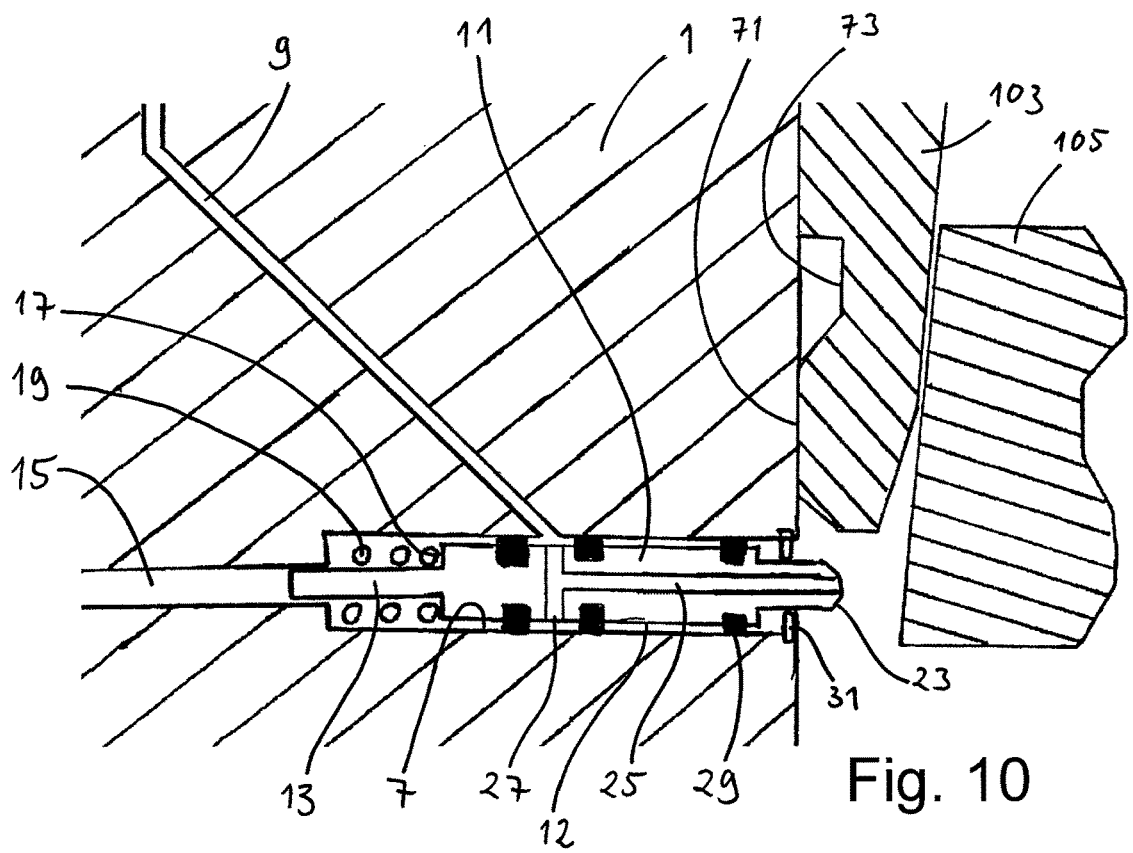
FIG. 10 depicts an alternative embodiment of the indication assembly substantially shown in FIG. 9.

FIG. 10 shows an indication assembly corresponding to the embodiment shown in FIG. 9, however with an alternative position of the mouth 27. The function of the assembly is as discussed with reference to FIG. 9. However, when in the shown, not-engaged position, there is fluid communication between the hydraulic channel 9 and the mouth 27. When the stem head 23 slides over the first sliding face 71, there will be no fluid communication and the operator can read a positive pressure. When in the locking position, wherein the stem head enters the recess with the locking indication face 73, there will again be fluid communication.

Figure 11:
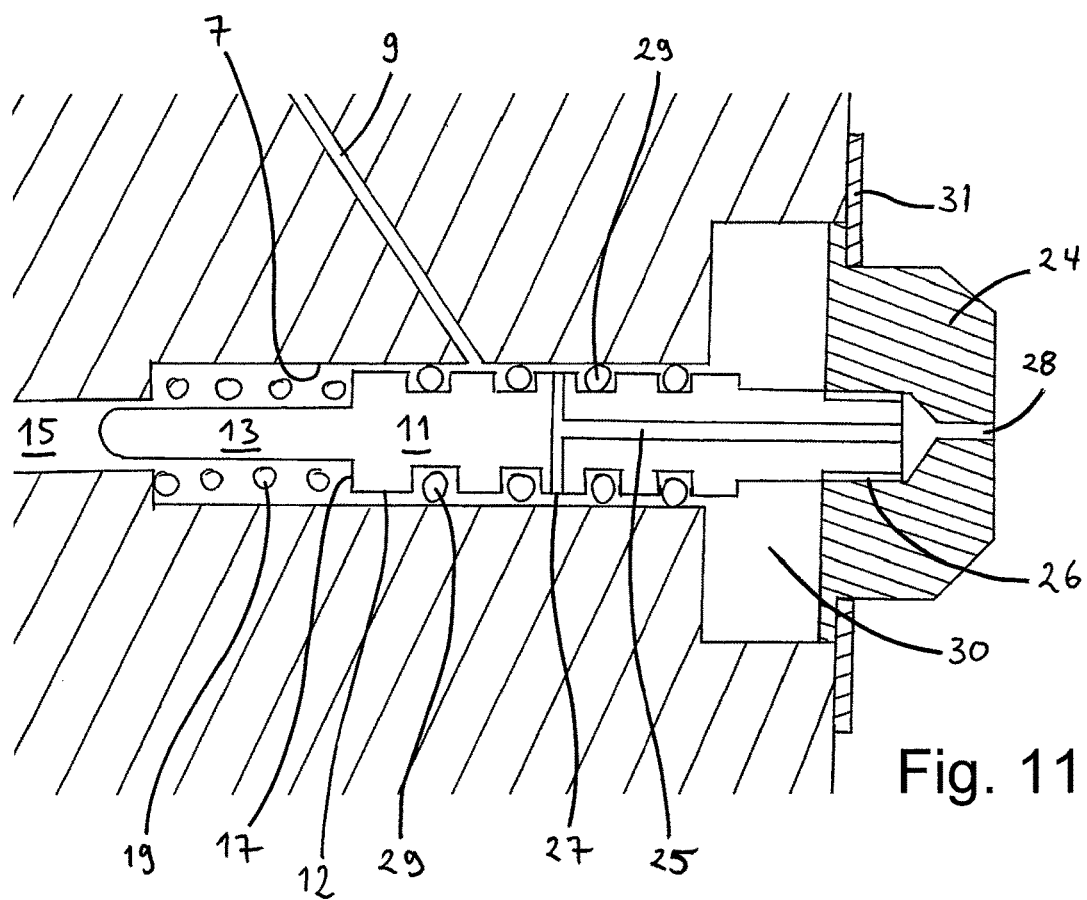
FIG. 11 depicts an alternative embodiment of an indication assembly configured for indication of correct landing of a landing body.

FIG. 11 depicts an indication assembly that has the same function as the assemblies discussed above. The indication assembly shown in FIG. 11 may thus be used as an indication assembly configured to indicate landing or locking of the landing body. In this embodiment, a head extension element, here in the form of an engagement key 24, is attached to the outer part of the sliding stem 11. In this embodiment, the engagement key 24 is attached to the stem head 23 with threads 26. To provide fluid communication between the stem channel 25 and the outside of the landing body 1, a through channel 28 in the engagement key 24 connects the stem channel 25 with the outside.

To receive the key 24 when the sliding stem 11 is in the inner, retracted position, a key receiving recess 30 is provided in the landing body 1 (tubing hanger). Furthermore, in order to halt the radially directed outward movement of the sliding stem 11 and the engagement key 24, a retaining member 31 is attached to the landing body 1. The retaining member 31 thus performs the same function as the retaining member 31 shown in the previously discussed embodiments.

The head extension element 24 may take other shapes, which will depend on the design of the components with which it will interact. As will be appreciated by the skilled person, by arranging a head extension element 24 onto the stem head 23, one can obtain a more robust assembly. Also, one may produce a plurality of standard assemblies, all having identical or similar stem bores 7, sliding stems 11, springs 19 etc., while adapting the assemblies to the specific use by having different types of head extension elements 24.

The invention claimed is:

1. A system comprising:
a subsea well equipment landing body (1) comprising an indicator assembly to indicate landing of the landing body (1), wherein the subsea well equipment landing body (1) comprises a sliding stem (11) with a stem head (23) protruding beyond an external face of the landing body; and
a subsea well component (53) having a bore (51) configured to receive the landing body (1),
wherein the bore (51) having a locking profile (57) configured to engage with locking means (5) of the landing body, wherein the bore further comprises a landing indication profile (59) on a radially inwardly facing face of the bore and at a vertical distance from the locking profile (57), wherein the landing indication profile (59) is configured to receive the stem head (23), wherein the landing indication profile (59) has a finite extension in the circumferential direction of the bore such that the extension is smaller than the circumference of the bore, wherein the landing indication profile (59) is void (empty) when the stem head (23) is not received in the landing indication profile (59), and wherein the landing indication profile (59) does not form a channel through the wall forming the bore (51) of the subsea well component (53).

2. A subsea well component according to claim 1, wherein the landing indication profile comprises a recess and wherein the recess is a circular hole.

3. A subsea well component according to claim 1, wherein the sliding stem is configured to slide in a horizontal direction.

* * * * *